United States Patent [19]

Ogata

[11] Patent Number: 4,675,742
[45] Date of Patent: Jun. 23, 1987

[54] IMAGE INFORMATION PROCESSING APPARATUS

[75] Inventor: Yukihiko Ogata, Kawasaki, Japan

[73] Assignee: Canon Kabushiki Kaisha, Tokyo, Japan

[21] Appl. No.: 715,410

[22] Filed: Mar. 25, 1985

[30] Foreign Application Priority Data

Mar. 29, 1984 [JP] Japan .................................. 59-59392
Mar. 29, 1984 [JP] Japan .................................. 59-59393

[51] Int. Cl.$^4$ .............................................. H04N 1/32
[52] U.S. Cl. .................................... 358/257; 358/285; 358/293
[58] Field of Search ........................ 358/285, 257, 293; 355/14 SH

[56] References Cited

U.S. PATENT DOCUMENTS

| 3,303,280 | 2/1967 | Fox | 358/257 |
| 3,647,947 | 3/1972 | Closs | 358/257 |
| 3,678,180 | 7/1972 | Bond | 358/257 |
| 4,218,129 | 8/1980 | Ishimoto | 355/14 SH |
| 4,248,529 | 2/1981 | Sato | 355/14 SH |
| 4,319,282 | 3/1982 | Hartman | 358/285 |
| 4,449,812 | 5/1984 | Furuichi | 355/14 SH |
| 4,455,081 | 6/1984 | Yoshimura | 355/14 SH |
| 4,547,058 | 10/1985 | Peffer | 355/14 SH |
| 4,561,772 | 12/1985 | Smith | 355/14 SH |

Primary Examiner—Edward L. Coles, Sr.
Attorney, Agent, or Firm—Fitzpatrick, Cella, Harper & Scinto

[57] ABSTRACT

There is described an apparatus for image transmission such as facsimile, having two trays for the original documents, one being for immediate transmission while the other is for transmission at a reserved time.

7 Claims, 6 Drawing Figures

IMAGE INFORMATION PROCESSING APPARATUS

BACKGROUND OF THE INVENTION

1. Field of the Invention

The present invention relates to an image information processing apparatus for reading and processing image information.

2. Description of the Prior Art

There is already known a facsimile apparatus for reading image information, and transmitting or recording the image information thus read.

In the conventional facsimile apparatus with reserved transmitting function, said reserved transmission is achieved either by placing the original documents to be transmitted on an original tray or storing the image information of the originals to be transmitted in a memory, and transmitting the image information at a reserved time.

However, in the former method in which the original documents are placed on the original tray, said tray is occupied once a reservation for transmission is made, so that the apparatus cannot be used for other transmission or copying and becomes quite inefficient.

On the other hand, in the latter method in which the image information of the original documents is stored in the memory, the apparatus will require a memory of an extremely large capacity and will therefore be expensive if a large number of original documents is to be handled.

SUMMARY OF THE INVENTION

In consideration of the foregoing, an object of the present invention is to provide an image information processing apparatus with an improved efficiency of use.

Another object of the present invention is to provide an inexpensive image information processing apparatus not utilizing a memory of a large capacity.

Still another object of the present invention is to provide an image information processing apparatus in which a reservation for transmission does not interfere with other transmitting or copying operations.

According to the present invention, these objects are attained by providing a image information processing apparatus having different support means for supporting originals which respectively are for immediate transmission or communication, and for transmission or communication at a reserved time, and having processing means for reading and processing image information from an original delivered to it from one or another of the support means.

The foregoing and still other objects of the present invention, and the advantage thereof, will become fully apparent from the following description.

DETAILED DESCRIPTION OF THE PREFERRED EMBODIMENTS

Now the present invention will be clarified in detail by references to the preferred embodiments, shown in the attached drawings.

Figure 1:
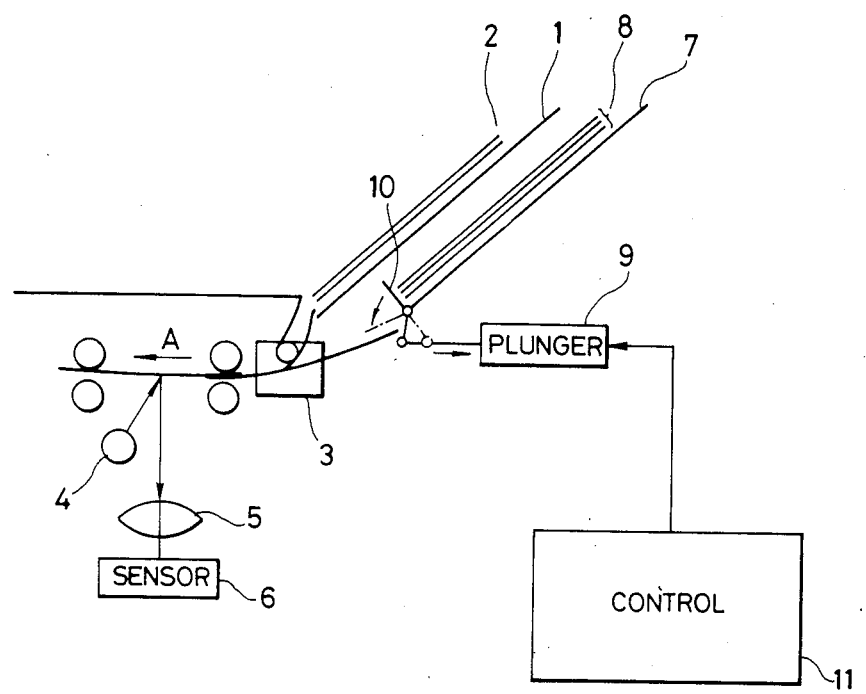
FIG. 1 is a schematic view of an image information processing apparatus embodying the present invention.
Figure 2:
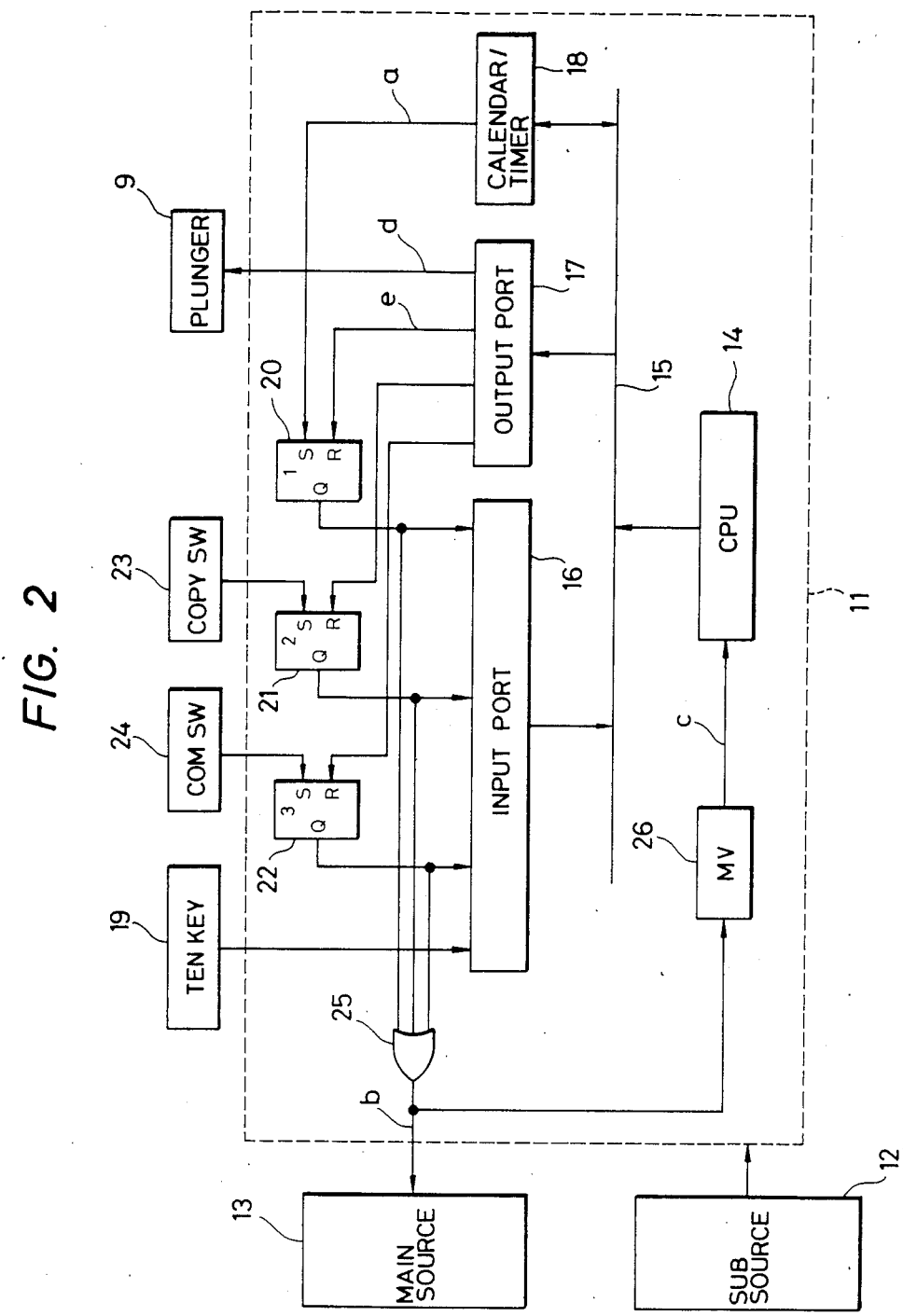
FIG. 2 is a block diagram of a control unit for use in the apparatus shown in FIG. 1.
Figure 3:
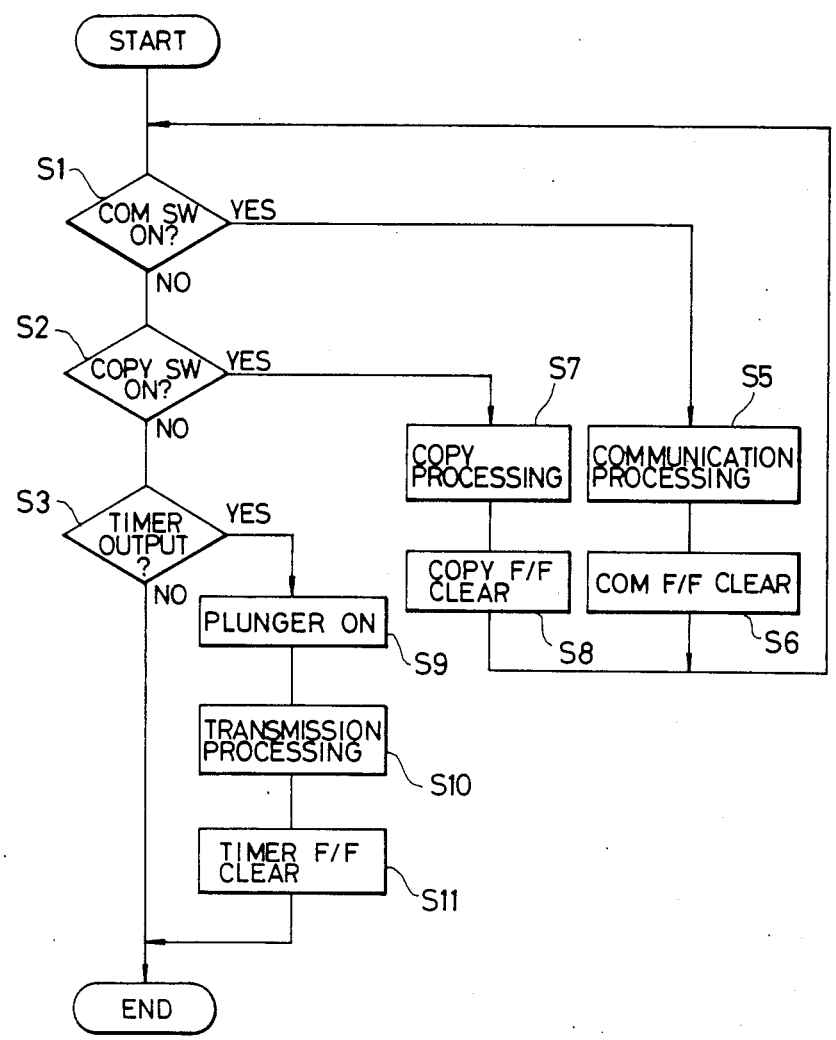
FIG. 3 is a flow chart showing a control procedure to be executed by the control unit shown in FIG. 2.

FIGS. 1 to 3 illustrate an embodiment of the present invention, wherein FIG. 1 schematically shows the mechanical structure thereof.

In this embodiment there are provided a tray 1 for placing the originals 2 for immediate transmission or copying and another tray 7 for placing originals 8 for reserved transmission, wherein the latter originals can be transmitted only at the reserved time.

In FIG. 1, a tray 1 for the originals for immediate transmission or copying supports originals 2, which are moved to an original separating device 3 and are fed one by one in the direction of arrow A.

The original thus fed is illuminated by a light source 4, and the reflected light is read, through an optical system 5, by an image sensor 6 to initiate the transmitting or copying operation.

Separate from said original tray 1 for immediate transmission or copying there is provided another original tray 7 for reserved transmission.

At the lower end of said tray 7 there is provided an original stopper 10, actuated by a plunger 9, to block the leading end of the originals to be transmitted which are placed on the tray 7.

The plunger 9 is controlled by a control unit 11. When energized, the plunger 9 rotates the original stopper 10, whereupon the original 8 moves by its own weight toward the original separating device 3.

Original-feeding from the tray 1 is prohibited when original-feeding from the tray 7 is initiated at a reserved time.

FIG. 2 shows the structure of the control unit 11.

The control unit 11 is rendered always operable by a sub-power source 12, but is powered by a main power source 13 when the operation is initiated.

The control unit 11 is principally composed of a central processing unit (CPU) 14 which is connected, through a bus line 15, to an input port 16, an output port 17, and a calendar/timer 18.

In the illustrated embodiment, a time for reserved transmission is set in the calender/timer 18 by entry with numeral keys (e.g., a ten-key pad) 19 through the input port 16 and the CPU 14.

When the reserved time is reached, said calendar/timer 18 releases an output signal a, thereby setting a first flip-flop 20.

The control unit 11 is further provided with second and third flip-flops 21, 22 which are respectively set by a copy switch 23 and a communication switch 24.

The first, second and third flip-flops 20–22 release, through an OR gate 25, a main power-on signal b, which turns on the main, large-capacity power source 13 and triggers a one-shot multivibrator 26 to generate a reset pulse c to the CPU 14.

Said reset pulse c resets the CPU 14 to initiate the function thereof. In the following there will be given an explanation of the control operation of the CPU 14, with reference to a flow chart shown in FIG. 3.

The CPU 14 is activated substantially simultaneously with the turning on of the main power source 13.

As the main power source 13 may be turned by the output signal of the timer 18, the copy switch 23 or the communication switch 24, the CPU 14 identifies, in steps S1–S3, which of these factors is active.

More specifically, the step S1 identifies the state of the communication switch 24, and, if it is closed, the program proceeds to a step S5 for effecting a communication process on the image information read by the image sensor 6. Then a step S6 clears the flip-flop 22 for communication switch, and the program returns to the step S1.

If the communication switch 24 is open, the program proceeds to the step S2 for indentifying the state of the copy switch 23, and, if it is closed, the program proceeds to a step S7 for a copying process on the image information read by the image sensor 6. Then a step S8 clears the flip-flop 21 for copy switch, and the program returns to the step S1.

In the case that the communication switch 24 and the copy switch 23 are both open, the program proceeds to the step S3 for identifying the state of the timer output signal a, and, if the timer output signal is present, the CPU 14 identifies the signals from the first flip-flop 20 and the input port 16 and releases a driving signal d through the output port 17, thereby energizing the plunger 9 to release the original stopper 10 (step S10).

As a consequence, the original 8 on the original tray 7 for reserved transmission is supplied to the original separating device 3, and the transmission of the image information read by the image sensor 6 is initiated (step S10).

Upon completion of the communication process, the CPU 14 releases a reset signal e through the output port 17, thereby clearing the first flip-flop 20 and terminating the control procedure (step S11).

In this manner the automatic transmission of the original can be achieved at a reserved time, without hindrance to the immediate transmission or copying even after the reservation for transmission is made, or without the use of a memory of a large capacity.

In the foregoing embodiment the tray for immediate transmission and the tray for reserved transmission are separately provided for feeding the originals along separate paths, but it is also possible to provide the tray for reserved transmission at the upstream side of the tray for immediate transmission, feeding the originals from the former to the latter.

Figure 4:
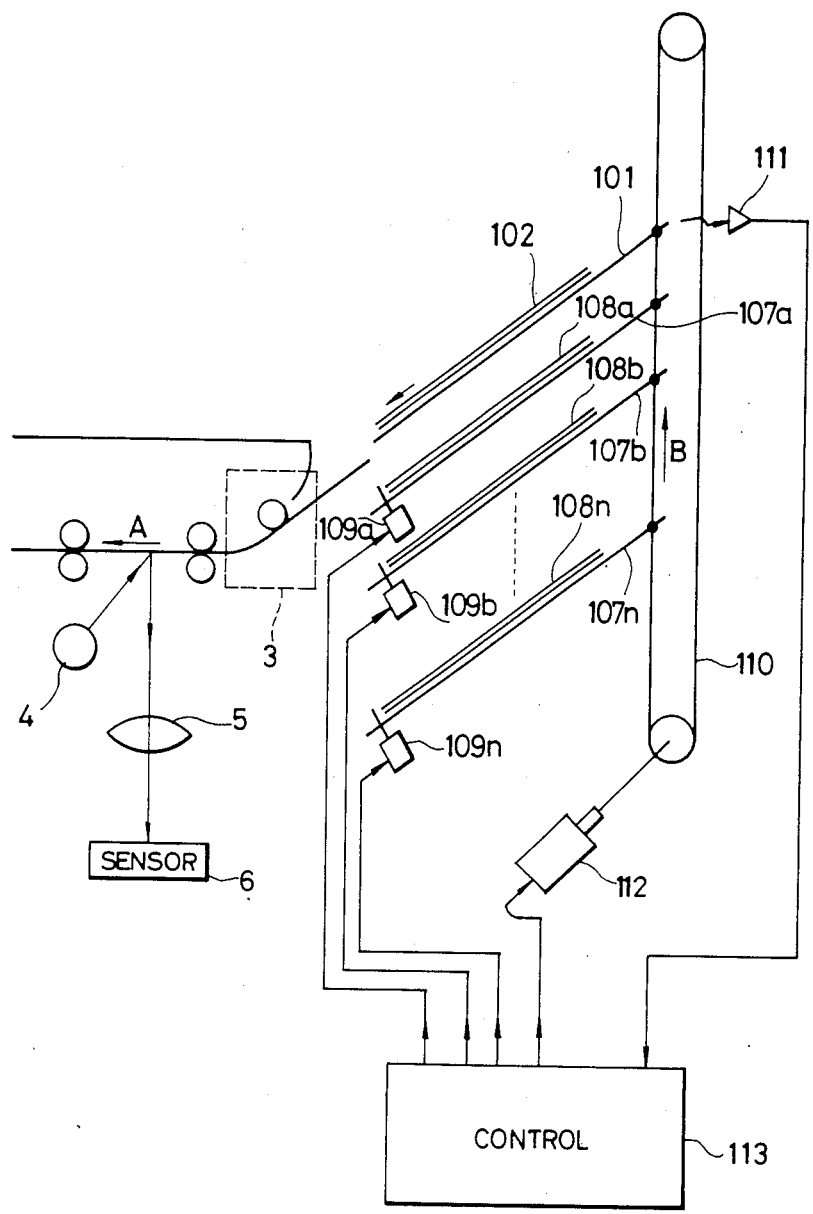
FIG. 4 is a schematic view showing an image information processing apparatus constituting another embodiment of the present invention.
Figure 5:
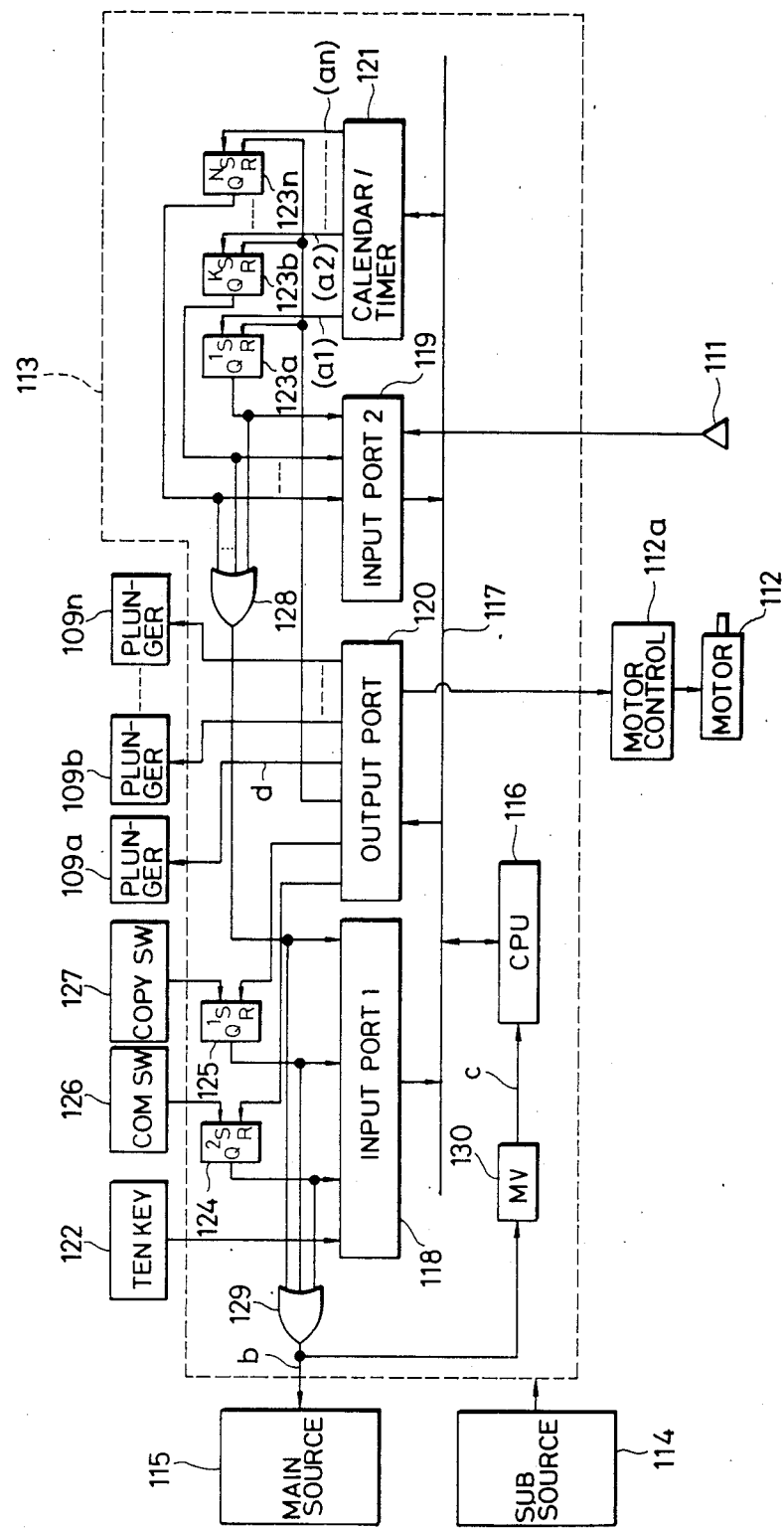
FIG. 5 is a block diagram showing a control unit for use in the apparatus shown in FIG. 4.
Figure 6:
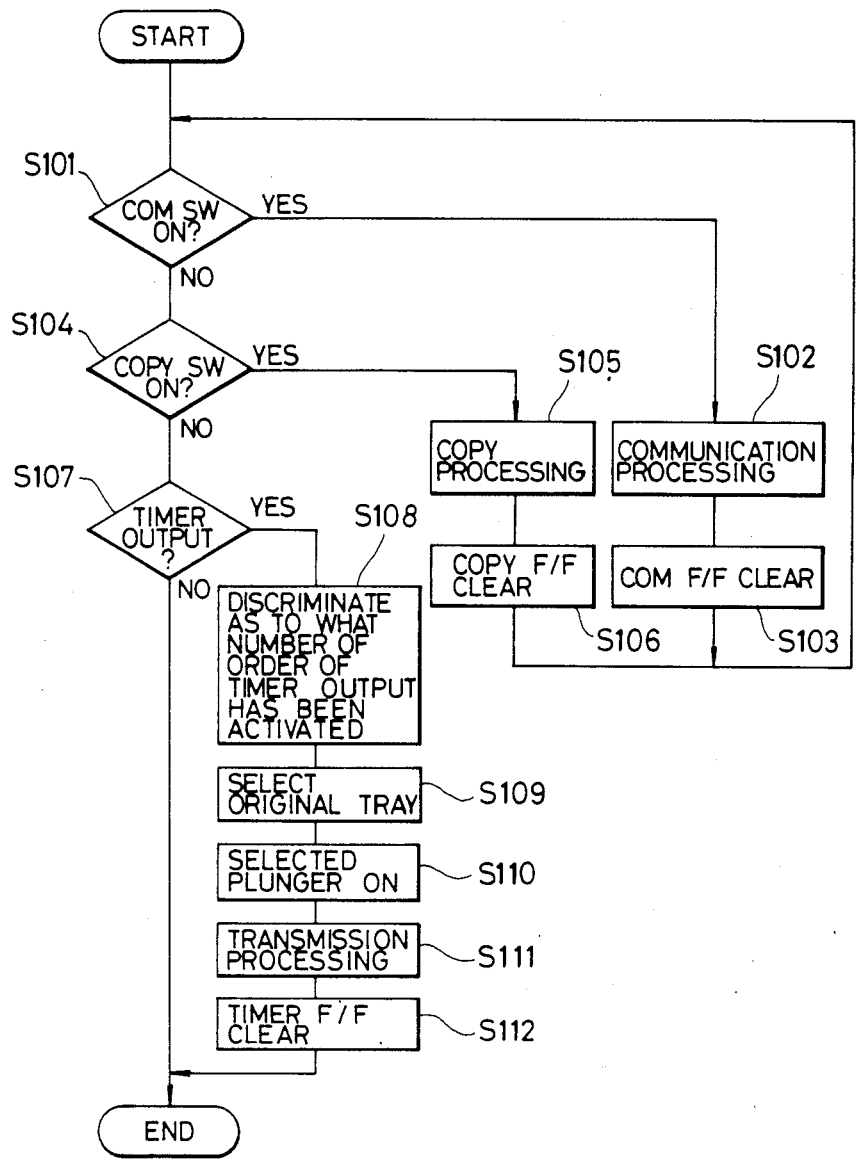
FIG. 6 is a flow chart showing a control procedure to be executed by the control unit shown in FIG. 5.

FIGS. 4 to 6 show another embodiment of the present invention, wherein are provided an original tray 101 for immediate transmission and plural original trays 107a–n for reserved transmissions of different reserved times, all of the trays being constructed to be movable to a position corresponding to the original separating device 3 in the main body of the apparatus. In FIGS. 4 to 6, the same components as those shown in FIGS. 1 and 2 are represented by the same numbers.

In FIG. 4, an original tray 101 for immediate transmission or copying supports the originals 102 to be transmitted or copied, which slide down to the original separating device 3 by gravity, due to the inclination of said tray 101.

As is already known, the original separating device 3 separates and feeds the originals one by one into a direction A.

Each original 102 is illuminated by the light source 4, and the reflected light is guided, through the optical system 5, to the image sensor 106, which reads the image information, whereby the transmitting or copying operation is initiated.

In addition, there are provided trays 107a–107n for reserved transmissions, respectively corresponding to mutually different reserved times.

Said original trays 107a–107n respectively support different originals 108a–108n.

The originals trays 107a–107n are respectively provided, at the lower ends thereof, with solenoid original stoppers 109a–109n.

All the original trays 101 and 107a–107n are mounted on an elevator mechanism 110 for vertical displacement in the inclined state.

At the side of said elevator mechanism 110 there is provided a tray sensor 111 for detecting and counting the trays.

Said elevator mechanism 110 is driven by a motor 112.

The original stoppers 109a–109n, original stoppers 109a–n, tray sensor 111 and motor 112 are controlled by a control unit 113.

FIG. 5 shows the structure of said control unit 113, wherein the same components as those in FIG. 4 are represented by the same numbers.

Said control unit 113 is rendered always operable by a sub-power source 114, but a main power source 115 is used in the operation state.

The control unit 113 is principally composed of a central processing unit (CPU) 116, which is connected, through a bus line 117, to first and second input ports 118, 119, an output port 120 and a calendar/timer 121.

Times for reserved transmissions are set in the calendar/timer 121 by entries through numeral keys (e.g., a ten-key pad) 122 through the input port 118 and the CPU 116.

When a reserved timed is reached, the calendar/timer 121 releases a timer output signal a1, . . . or an, thereby setting one of flip-flops 123a–123n for the 1st-n-th timer, respectively.

In addition to said flip-flops 123a–123n, the control unit 113 is provided with first and second flip-flops 124, 125 which are respectively set by a communication switch 126 and a copy switch 127.

The output signal of the flip-flops 123a–123n or the output signal of the first and second flip-flops 124, 125 is supplied, respectively, through OR gates 128, 129, as a main power-on signal b.

Said signal b triggers a one-shot multivibrator 130 to supply a reset pulse c to the CPU 116, thus resetting and activating the same.

In the following there will be given an explanation of the control function of the control unit after activation, with reference to a flow chart shown in FIG. 6.

In response to the turning on of the main power source 115, the CPU 116 is reset to start the procedure from a step S101.

The main power source 115 can be turned on by the output signals a1-an of the calendar/timer 121, the output signal of the communication switch 126, or the output signal of the copy switch 127.

For discriminating the state, the signal from the first input port 118 is identified.

If a step S101 identifies that the communication switch 126 is closed, the program proceeds to a step S102 for effecting a communication process on the image information read by the image sensor 6. Then a step S103 clears the first flip-flop 124 and the program returns to the step S101.

If the communication switch 126 is open in the step S101, a step S104 identifies the state of the copy switch 127, and, if it is closed, the program proceeds to a step S105 for effecting a copy process on the image information read by the image sensor 6. Then a step S106 clears the second flip-flop 125, and the program returns to the step S101.

If the copy switch 127 is open in the step S104, the program proceeds to a step S107 for identifying the output signal of the calendar/timer 121. If any of the flip-flops 123a–123n is set, a step S108 checks the signal from the second input port 119 to identify the flip-flop in the set state.

If the k-th flip-flop, for example, is identified to be in the set state, a step S109 selects the k-th original tray 109k.

The selection of said original tray is effected by activating a motor control circuit 112a through the output port 120.

In response to the rotation of the motor 112, all the original trays are elevated by the elevator mechanism 110.

The tray sensor 111 generates a pulse in response to each passing original tray.

The CPU 116 counts said pulses through the second input port 119, and, in response to the k-th pulse, terminates the rotation of the motor 112 (step S109). Also, a driving signal d is supplied through the output port 120 to activate the plunger 109k, thereby releasing the originals supported by the plunger 109k (step S110).

As the result, the original 108a is moved to the original separating device 3, and the image information of the separated original is read by the image sensor and is subjected to a communication process (step S110). Upon completion of said process, a reset signal is released from the CPU 16 through the output port 120 to clear the flip-flop 109k of the calendar/timer 121 (step S112), thus terminating the process.

In this manner the processes are effected at respective reserved times.

Naturally, in the unoccupied period between the reserved times, there may be effected an immediate transmission or copying operation.

In the foregoing embodiment the trays are constructed to be movable, but the present invention is not limited to such embodiment. For example it is also possible to fix the trays, and to provide said trays with respective transport paths to the separating device and with respective sheet feed means.

As explained in the foregoing, there are provided an original tray for immediate transmission or copying and another original tray for reserved transmission, the latter being so constructed as to feed the originals to the apparatus only at a reserved time, whereby the immediate transmitting or copying operation is not hindered even when a transmission is reserved, without the use of a memory of a large capacity.

I claim:

1. An image information processing apparatus comprising:

first support means for supporting an original;

second support means for supporting an original for reserved transmission, said second support means being different from said first support means;

processing means for reading and processing the image information of the original supported by said first or second support means;

instruction means for instructing a start of reading and processing operation of said processing means;

timer means adapted to set a reservation time; and feed control means for controlling the feeding of the original from said first or second support means in such a manner that the image information of the original supported by said first support means is read and processed by said processing means in response to an instruction signal from said instruction means, and that the image information of the original supported by said second support means is read and processed by said processing means in response to a time signal from said timer means, which signal indicates that said timer has reached the reservation time set by means of said timer means.

2. An image information processing apparatus according to claim 1, wherein said processing means is adapted to transmit the read image information.

3. An image information processing apparatus according to claim 2, wherein said instruction signal is a signal for instructing said transmission.

4. An image information processing apparatus according to claim 1, wherein said processing means is adapted to record the read image information.

5. An image information processing apparatus according to claim 4, wherein said instruction signal is a signal for instructing said recording.

6. An image information processing apparatus according to claim 1, wherein said feed control means is adapted, in response to said time signal, to initiate the feeding of the original from said second support means to said processing means.

7. An image information processing apparatus according to claim 1, wherein, in the event that there is no instruction signal from said instruction means, said feed control means is operable to perform feed control of the original supported by said second support means, in response to the time signal from said timer means.

* * * * *